United States Patent
Ko et al.

(10) Patent No.: US 10,744,900 B2
(45) Date of Patent: Aug. 18, 2020

(54) VEHICLE HAVING CONTROLLER FOR MANAGING BATTERY AND METHOD FOR THE SAME

(71) Applicants: HYUNDAI MOTOR COMPANY, Seoul (KR); KIA MOTORS CORPORATION, Seoul (KR)

(72) Inventors: KyuBeom Ko, Incheon (KR); Seungmyun Chung, Seoul (KR); Jincheol Shin, Seoul (KR); Chae Mo Yang, Gunpo-si (KR); Taewoo Lee, Siheung-si (KR); Deok Keun Shin, Yongin-si (KR); Jaeseok You, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 303 days.

(21) Appl. No.: 15/793,863

(22) Filed: Oct. 25, 2017

(65) Prior Publication Data
US 2019/0023150 A1  Jan. 24, 2019

(30) Foreign Application Priority Data
Jul. 19, 2017 (KR) .................. 10-2017-0091389

(51) Int. Cl.
| B60L 58/25 | (2019.01) |
| B60L 1/08 | (2006.01) |
| B60L 58/13 | (2019.01) |
| B60L 53/62 | (2019.01) |

(Continued)

(52) U.S. Cl.
CPC .............. B60L 58/25 (2019.02); B60L 1/08 (2013.01); B60L 53/62 (2019.02); B60L 58/13 (2019.02); B60L 58/24 (2019.02); B60L 58/27 (2019.02); *B60L 2240/34* (2013.01); *B60L 2240/545* (2013.01)

(58) Field of Classification Search
CPC .......... B60L 58/25; B60L 58/24; B60L 58/13; B60L 53/62; B60L 58/27; B60L 1/08; B60L 2240/36; B60L 2240/34; B60L 2240/545
See application file for complete search history.

(56) References Cited

U.S. PATENT DOCUMENTS

| 6,943,460 | B2 * | 9/2005 | Wakashiro et al. | B60L 58/25 290/40 C |
| 8,035,247 | B2 * | 10/2011 | Ichikawa | B60L 58/25 307/10.1 |
| 9,114,794 | B2 * | 8/2015 | King et al. | B60L 58/27 |

(Continued)

FOREIGN PATENT DOCUMENTS

| WO | WO2019181310 A1 * | 9/2019 | ............. B60L 1/00 |
| WO | WO2019181311 A1 * | 9/2019 | ............. B60L 58/00 |

*Primary Examiner* — Dale W Hilgendorf
(74) *Attorney, Agent, or Firm* — Morgan, Lewis & Bockius LLP

(57) ABSTRACT

Disclosed are a vehicle and method for managing a battery for vehicle. The vehicle includes a battery configured to be charged and discharged while connected to a charger; and a controller configured to charge the battery by distributing charging current for the battery with the foremost priority if the charging current for the battery is smaller than consumption current, and distribute the consumption current after a state of charge (SoC) of the battery reaches a target charging level.

19 Claims, 10 Drawing Sheets

(51) Int. Cl.
 *B60L 58/27* (2019.01)
 *B60L 58/24* (2019.01)

(56) References Cited

U.S. PATENT DOCUMENTS

| | | | |
|---|---|---|---|
| 2011/0046828 A1* | 2/2011 | Chander et al. | B60L 2240/545 701/22 |
| 2013/0289812 A1* | 10/2013 | Anzicek | B60L 58/27 701/22 |
| 2014/0266038 A1* | 9/2014 | Gibeau et al. | B60L 58/25 320/109 |
| 2017/0008419 A1* | 1/2017 | Kim | B60L 58/27 |

\* cited by examiner

VEHICLE HAVING CONTROLLER FOR MANAGING BATTERY AND METHOD FOR THE SAME

CROSS-REFERENCE TO RELATED APPLICATION

This application is based on and claims the benefit of priority to Korean Patent Application No. 10-2017-0091389, filed on Jul. 19, 2017 with the Korean Intellectual Property Office, the entire disclosures of which is incorporated herein by reference.

TECHNICAL FIELD

The present disclosure relates to a vehicle and method for managing a battery for vehicle.

BACKGROUND

As the capacity of batteries for electric vehicles has become higher, the way of cooling and heating the battery is changing into water cooling type. The change from air-cooling of lower-capacity batteries to the water-cooling type has increased efficiency of battery cooling systems but lowered heating efficiency of a battery left under a low temperature as compared to the existing heating wire type and has also increased consumption power.

In a case of heating the battery during low-current charging, it is often the case that heating current increases relative to charging current. It leads to a phenomenon that charging of the battery is stopped without proceeding, or that energy is consumed even while the battery is being charged.

Even if the battery's energy is properly used to heat itself, by the nature of In Cable Control Box (ICCB) charging that takes about 10 hours minimum, the temperature of the battery is likely to drop again at a time of completion of charging, and to prevent this, continuous heating is required.

In the meantime, as the battery's cell density increases, the output power (or power performance) at low temperatures is not enough, and this may be prevented by heating the battery.

Accordingly, appropriate distribution from within a limited current between charging and heating is required.

SUMMARY

Embodiments of the present disclosure are to provide a vehicle and method for managing a battery for vehicle, by which a charging current control strategy is provided for more efficient battery management under a condition of limited supply of charging current for the battery.

In accordance with one aspect of the present disclosure, a vehicle includes: a battery configured to be charged and discharged while connected to a charger; and a controller configured to charge the battery by distributing charging current for the battery with the foremost priority if the charging current for the battery is smaller than consumption current, and distribute the consumption current after a state of charge (SoC) of the battery reaches a target charging level.

The controller may maintain the battery not to be heated until the SoC of the battery reaches the target charging level.

If battery charging only is requested, the target charging level includes a user's target SoC.

The vehicle may further include: a batter heater configured to heat the battery; and an air conditioner configured to manage temperature, humidity, and air cleanliness in the vehicle.

The controller may drive the battery heater and the air conditioner after the battery is charged to the target charging level, if battery charging and reserved air conditioning are requested by a user.

The target charging level includes the user's target SoC or an SoC required for heating the battery.

The controller may drive the battery heater with the higher priority than the air conditioner.

The controller may drive the air conditioner considering a starting time of the vehicle after the battery is charged to the target charging level, if reserved air conditioning is requested by a user.

The target charging level includes a user's target SoC.

The controller may drive the battery heater after the battery is charged to the target charging level, if battery heating is requested by a user.

The consumption current comprises a current required to manage the vehicle including a battery heating current, an Low Voltage DC-DC Converter (LDC) driving current, and an air conditioning current.

In accordance with one aspect of the present disclosure, a method for managing a battery for vehicle, the method includes: starting charging a battery; comparing charging current for the battery and consumption current; and keeping the battery charged by distributing the charging current for the battery with the top priority, if the charging current for the battery is smaller than the consumption current.

The method may further include: maintaining the battery not to be heated until a state of charge (SoC) of the battery reaches a target charging level, when the battery is charged.

The target charging level includes a user's target SoC or an SoC required for heating the battery.

The method may further include: if battery heating and reserved air conditioning are requested by the user before distributing the charging current for the battery with the top priority, driving a battery heater and an air conditioner after the SoC of the battery reaches a target charging level when the battery is charged.

The driving a battery heater and an air conditioner after the SoC of the battery reaches a target charging level when the battery is charged comprises driving the battery heater with the higher priority than the air conditioner.

The method may further include: if reserved air conditioning is requested by a user before the charging current for the battery is distributed first, driving an air conditioner considering a starting time of the vehicle after the SoC of the battery reaches a target charging level when the battery is charged.

The method may further include: if heating of the battery is requested by a user before the charging current for the battery is distributed first, driving a battery heater after the SoC of the battery reaches a target charging level when the battery is charged.

The consumption current comprises a current required to manage the vehicle including a battery heating current, an Low Voltage DC-DC Converter (LDC) driving current, and an air conditioning current.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
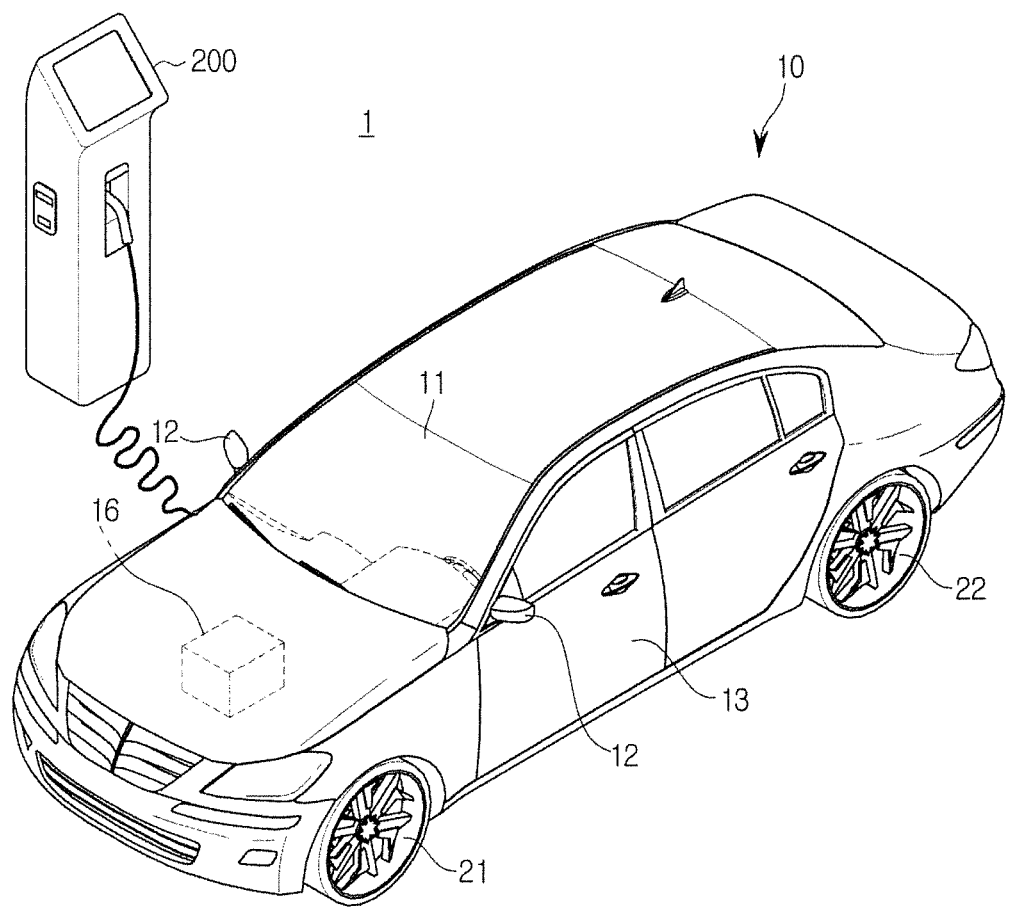
FIG. 1 shows the exterior of a vehicle.

Like numerals refer to like elements throughout the specification. Not all elements of embodiments of the present disclosure will be described, and description of what are commonly known in the art or what overlap each other in the embodiments will be omitted. The terms as used throughout the specification, such as "~ part", "~ module", "~ member", "~ block", etc., may be implemented in software and/or hardware, and a plurality of "~ parts", "~ modules", "~ members", or "~ blocks" may be implemented in a single element, or a single "~ part", "~ module", "~ member", or "~ block" may include a plurality of elements.

It will be further understood that the term "connect" or its derivatives refer both to direct and indirect connection, and the indirect connection includes a connection over a wireless communication network.

The term "include (or including)" or "comprise (or comprising)" is inclusive or open-ended and does not exclude additional, unrecited elements or method steps, unless otherwise mentioned.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are just used for convenience of explanation, but not to limit an order of the steps. Thus, unless the context clearly dictates otherwise, the written order may be practiced otherwise.

The principle and embodiments of the present invention will now be described with reference to accompanying drawings.

FIG. 1 shows the exterior of a vehicle.

Referring to FIG. 1, the exterior of a vehicle 1 may include a main body 10 that constitutes the exterior of the vehicle 1, a windscreen 11 for providing views ahead of the vehicle 1 for the driver, side mirrors 12 for helping the driver see views behind the vehicle 1, doors 13 for shielding the interior of the vehicle 1 from outside, and wheels 21 and 22 for moving the vehicle 1 including front wheels 21 located in the front part of the vehicle 1, rear wheels 22 located in the rear part of the vehicle 1.

The windscreen 11 is mounted on the upper front of the main body 10 for allowing the driver to obtain views ahead of the vehicle 1. The side mirrors 12 include a left side mirror and a right side mirror placed on the left and right sides of the main body 10, respectively, for helping the driver obtain views behind and to the sides of the vehicle 1.

The doors 13 may be pivotally attached onto the left and right sides of the main body 10, and opened for the driver and passenger to get on or get off the vehicle 1 and closed for shielding the inside of the vehicle 1 from outside.

In addition to what are described above, the vehicle 1 may include a power system 16 for turning the wheels 21 and 22, a steering system (not shown) for changing moving direction of the vehicle 1, and a braking system (not shown) for stopping the movement of the wheels.

The power system 16 provides turning force to the front or rear wheels 21 or 22 to move the main body 10 forward or backward. The power system 16 may include a motor that produces the turning force from electrical power supplied from a charging battery (not shown) or a combustion engine (not shown) that burns a fuel to create the turning force.

The steering system may include a steering handle 42 (see FIG. 2) manipulated by the driver for controlling driving direction, a steering gear (not shown) for transforming the rotary motion of the steering handle 42 to the reciprocating motion, and a steering link (not shown) for transferring the reciprocating motion of the steering gear to the front wheels 21. The steering system may change the moving direction of the vehicle 1 by changing the direction of the wheel rotation axis.

The braking system may include a brake pedal (not shown) manipulated by the driver for braking operation, a brake drum (not shown) combined with the wheels 21, 22, and a brake shoe (not shown) for braking the rotation of the brake drum. The braking system may brake driving of the vehicle 1 by stopping the rotation of the wheels 21, 22.

The vehicle 1 may be an electric vehicle driven by charging a battery (not shown), and may be connected to a charging system 200 to perform charging, discharging, and leaving the battery. For this, the vehicle 1 and the charging system 200 may be connected to a power network server (not shown) for transmitting control signals to manage the battery through wired or wireless communication.

In the following description, the vehicle is assumed to be an electric vehicle, for example.

Figure 2:
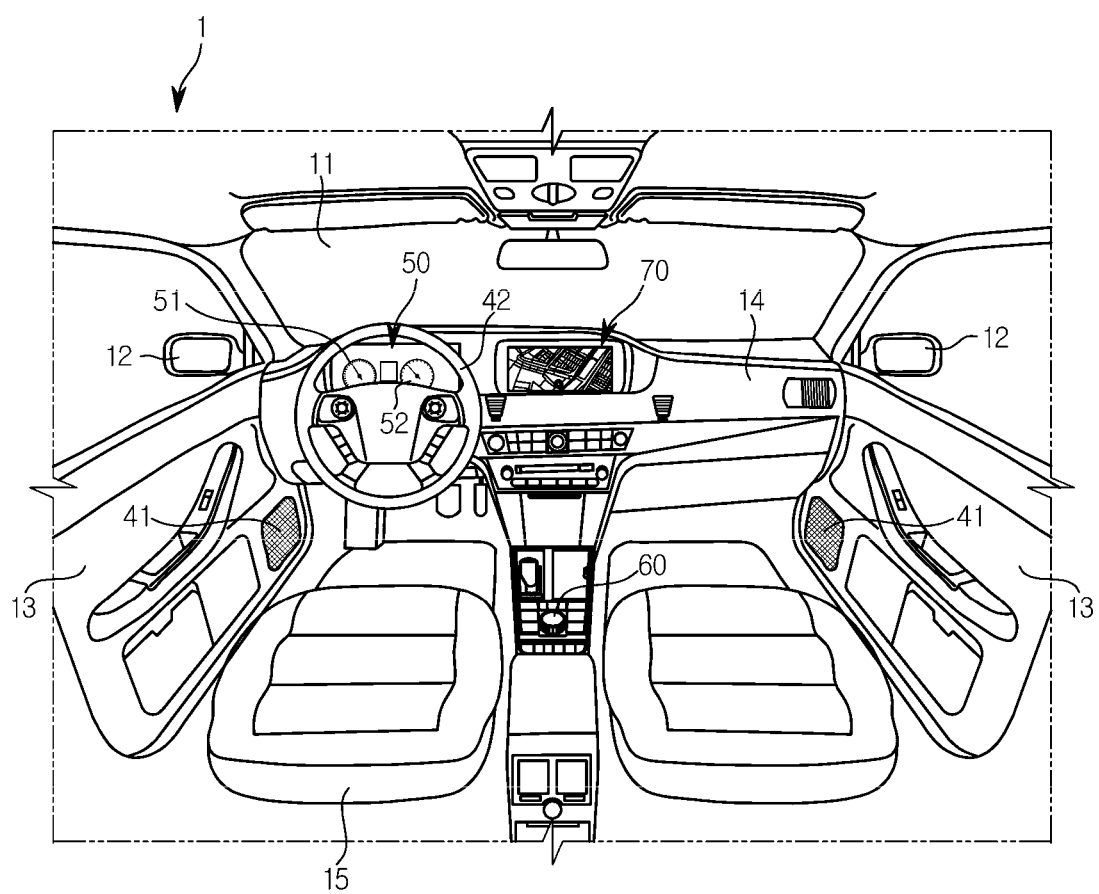
FIG. 2 shows the interior of a vehicle.

FIG. 2 shows the interior of a vehicle.

The interior of the vehicle 1 may include a dashboard 14 on which various systems are installed for the driver to manipulate the vehicle 1, a driver seat 15 seated by the driver, cluster indicators 50 for indicating information about operation of the vehicle 1, and a navigation system 70 for providing not only a route guidance function to give directions but also audio and video functions in response to an instruction from the driver.

The dashboard 14 may be formed to protrude toward the driver from the bottom of the winds screen 11, allowing the driver to manipulate the various systems installed on the dashboard 14 while looking forward.

The driver seat 15 is located opposite the dashboard 14, allowing the driver to drive the vehicle 1 while keeping his/her eye on the road ahead of the vehicle 1 and various systems on the dashboard in a comfortable position.

The cluster indicators 50 may be installed on the dashboard 14 to face the driver seat 15, and may include a speed gage 51 for indicating the current speed of the vehicle 1 and an rpm gage 52 for indicating revolutions per minute of the power system.

The cluster indicators 50 may also indicate a battery charging level, and a battery state, such as charged, discharged, or left alone. The battery state may be indicated on a display of the navigation system 70 or on an extra display equipped in the vehicle 1 as well, apart from the cluster indicators 50.

The navigation system 70 may include a display for displaying information about a road the vehicle 1 is traveling or a route to a destination intended by the driver, and a speaker 41 for producing sound at the control command of the driver. Recently, it is a trend to install an audio video and navigation (AVN) system in which audio and video players and a navigation system are incorporated on the vehicle.

The navigation system 70 may be installed on the center fascia. The center fascia refers to a control panel portion located on the dashboard 14 between the driver and passenger seats, where the dashboard 14 and a shift lever joins in the vertical direction, having the navigation system 70, an air conditioner, a heater controller, a duct, a cigar jack and ash tray, a cup holder, etc., installed therein. The center fascia may also serve to draw a line between the driver seat and the passenger seat along with a center console.

Furthermore, there may be an extra jog dial 60 for manipulating operation of various systems, including the navigation system 70.

In an embodiment of the present disclosure, the jog dial 60 may not only manipulate the operation by being turned or pressed, but may also have a touch recognizable touch pad to recognize handwriting of the user's finger or extra touch-recognizable tool for operation manipulation.

Figure 3:
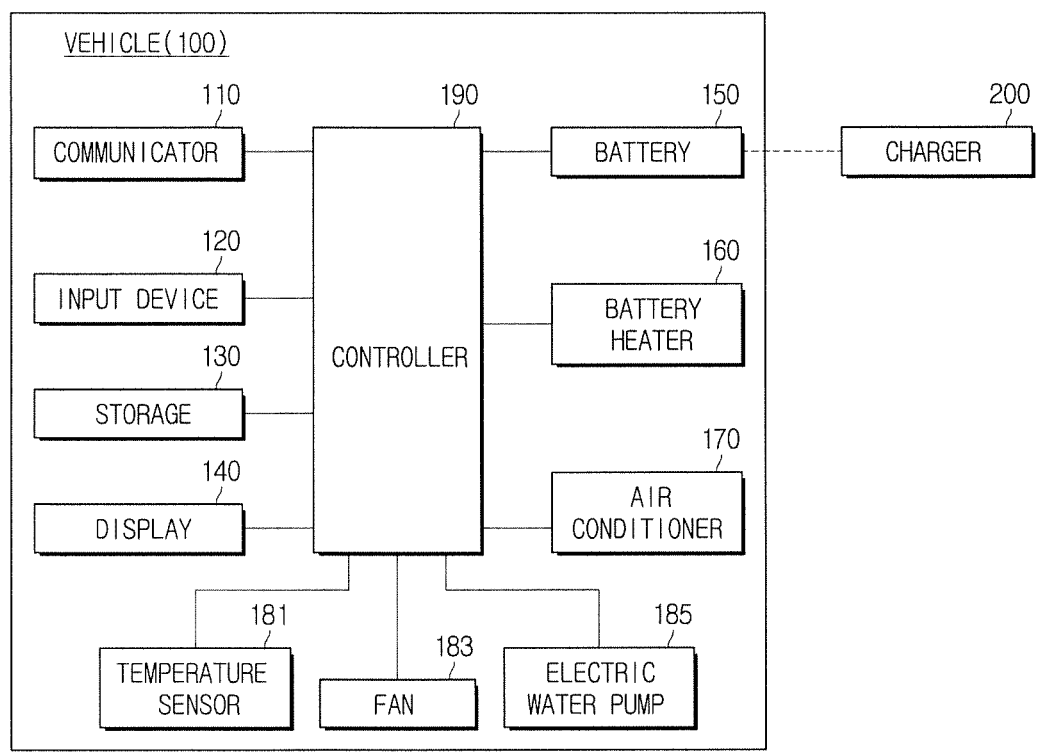
FIG. 3 is a detailed control block diagram of a vehicle.

FIG. 3 is a detailed control block diagram of a vehicle.

Current limitation depending on battery temperatures will be described below with reference to FIGS. 4 and 5, and a method for managing a battery for vehicle will be described below with reference to FIGS. 6 to 9.

Referring to FIG. 3, the vehicle 100 may include a communicator 110, an inputter 120, a storage 130, a display 140, a battery 150, a battery heater 160, an air conditioner 170, a temperature sensor 181, a fan 183, an electric water pump 185, and a controller 190.

The controller 190 is an electric circuitry that executes instructions of software which thereby performs various functions described hereinafter.

The communicator 110 may be configured to perform communication with a charger 200 and an external device.

The communicator 110 may include one or more components that enable communication with an external device, for example, at least one of a short-range communication module, wired communication module, and wireless communication module.

The short-range communication module may include various short range communication modules for transmitting and receiving signals within a short range over a wireless communication network, such as BLUETOOTH module, an infrared communication module, a radio frequency identification (RFID) communication module, a wireless local access network (WLAN) communication module, a near field communication (NFC) module, a ZIGBEE communication module, etc.

The wired communication module may include not only one of various wired communication modules, such as a controller area network (CAN) communication module, a local area network (LAN) module, a wide area network (WAN) module, or a value added network (VAN) module, but also one of various cable communication modules, such as a universal serial bus (USB), a high definition multimedia interface (HDMI), a digital visual interface (DVI), recommended standard (RS) 232, a power cable, or a plain old telephone service (POTS).

The wireless communication module may include a wireless communication module for supporting various wireless communication schemes, such as a radio data system-traffic message channel (RDS-TMC), a digital multimedia broadcasting (DMB) module, a wireless fidelity (WiFi) module, and a wireless broadband (Wibro) module, and plus, a global system for mobile communication (GSM) module, a code division multiple access (CDMA) module, a wideband code division multiple access (WCDMA) module, a universal mobile telecommunications system (UMTS), a time division multiple access (TDMA) module, a long term evolution (LTE) module, etc.

The wireless communication module may also include an wireless communication interface with an antenna and receiver for receiving traffic information signals. Furthermore, the wireless communication module may include a traffic information signal conversion module for demodulating a received analog radio signal into a digital control signal through the wireless communication interface.

The communicator 110 may further include a local communication module (not shown) for communication between local electric devices in the vehicle 100. The local communication of the vehicle 100 may use a protocol, such as Controller Area Network (CAN), Local Interconnection Network (LIN), FlexRay, Ethernet, etc.

The inputter 120 may receive various control requests to control operation of the vehicle 100, including a target charging level of the battery, a request to heat the battery, reserved air conditioning, etc.

The inputter 120 may include many different buttons or switches, a pedal, a keyboard, a mouse, a track ball, various levers, a handle, a stick, or some hardware devices for the user input.

The inputter 120 may also include a Graphical User Interface (GUI), i.e., a software device, such as a touch pad for the user input. The touch pad may be implemented with a touch screen panel (TSP), thus forming a interlayer structure with the display 140.

The storage 130 may store the target charging level of the battery, a reference for battery management, and other various information relating to operation of the vehicle 100.

The storage 130 may be implemented with at least one of a non-volatile memory device, such as cache, read only memory (ROM), programmable ROM (PROM), erasable programmable ROM (EPROM), electrically erasable programmable ROM (EEPROM), a volatile memory device, such as random access memory (RAM), or a storage medium, such as hard disk drive (HDD) or compact disk (CD) ROM, without being limited thereto. The storage 130 may be a memory implemented with a chip separate from the aforementioned processor in relation to the controller 190, or may be implemented integrally with the processor in a single chip.

The display 140 may display various kinds of information relating to operation of the vehicle 100, including battery charging, battery heating, reserved air conditioning, and other operation of the vehicle 100.

The display 140 may include a Cathode Ray Tube (CRT), a Digital Light Processing (DLP) panel, a Plasma Display Panel (PDP), a Liquid Crystal Display (LCD) panel, an Electro Luminescence (EL) panel, an Electrophoretic Display (EPD) panel, an Electrochromic Display (ECD) panel, a Light Emitting Diode (LED) panel, an Organic Light Emitting Diode (OLED) panel, etc., but is not limited thereto.

The battery 150 may be charged or discharged while being connected to the charger 200.

The battery 150 may be comprised of multiple unit cells and charged with high voltage to provide a driving voltage for a motor (not shown). The battery 150 may supply the driving voltage to the motor in a Hybrid Electric Vehicle (HEV) mode or an Electric Vehicle (EV) mode.

The battery 150 may be charged with the voltage and current applied by the charger 200 when plugged into a commercial power source.

The battery heater 160 may be configured to heat the battery 150.

The battery heater 160 may receive a heating current distributed under the control of the controller 190 to heat the battery 150.

The air conditioner 170 may be configured to manage temperature, humidity, and air purity in the vehicle 100.

The temperature sensor 181 may be configured to measure the temperature of the battery 150. The temperature sensor 181 may also measure inside or outside temperatures of the vehicle, or may further include an extra temperature sensor to measure the inside or outside temperatures of the vehicle.

The fan 183 may be configured to generate an air blast and cool the battery 150 with the air blast.

The electric water pump 185 may be configured to cool off the heat of the battery 150 through circulation of a coolant.

During charging of the battery 150, the controller 190 may charge the battery 150 by distributing a charging current for the battery 150 first and foremost if the charging current for the battery 150 is smaller than consumption current, and then distribute the consumption current after the state of charge (SoC) of the battery 150 reaches the target charging level.

That is, the controller 190 may not perform heating on the battery 150 until the SoC of the battery 150 reaches the target charging level. The controller 190 performs battery charging with the top priority.

The target charging level may include the user's target SoC or a SoC required for heating the battery. If just battery charging is requested or if both battery charging and reserved air conditioning are requested, the target charging level may include the user's target SoC. In this regard, the user may set a target SoC through the inputter 120.

On the other hand, if both heating of the battery and reserved air conditioning are requested or if just heating of the battery is requested, the target charging level may include the user's target SoC and the SoC required to heat the battery. That is, the target charging level may refer to a combination of the user's target SoC and the SoC required for heating the battery. The SoC required for heating the battery may be used in heating the battery, which will be described in more detail later.

The consumption current as herein used may refer to a current required to manage the vehicle, including a battery heating current, a Low Voltage DC-DC Converter (LDC) driving current, and an air conditioning current. That is, the consumption current may refer to a current required by the vehicle other than the battery charging current.

The SoC (energy) required for heating the battery may be represented by (current battery temperature−target battery temperature)/heating efficiency. The heating efficiency may be represented by a change of temperature/(heating energy−charging energy per hour).

Maintaining heating operation for the battery 150 not to be performed during low current battery charging will be described in more detail in connection with FIGS. 4 and 5.

Figure 4:
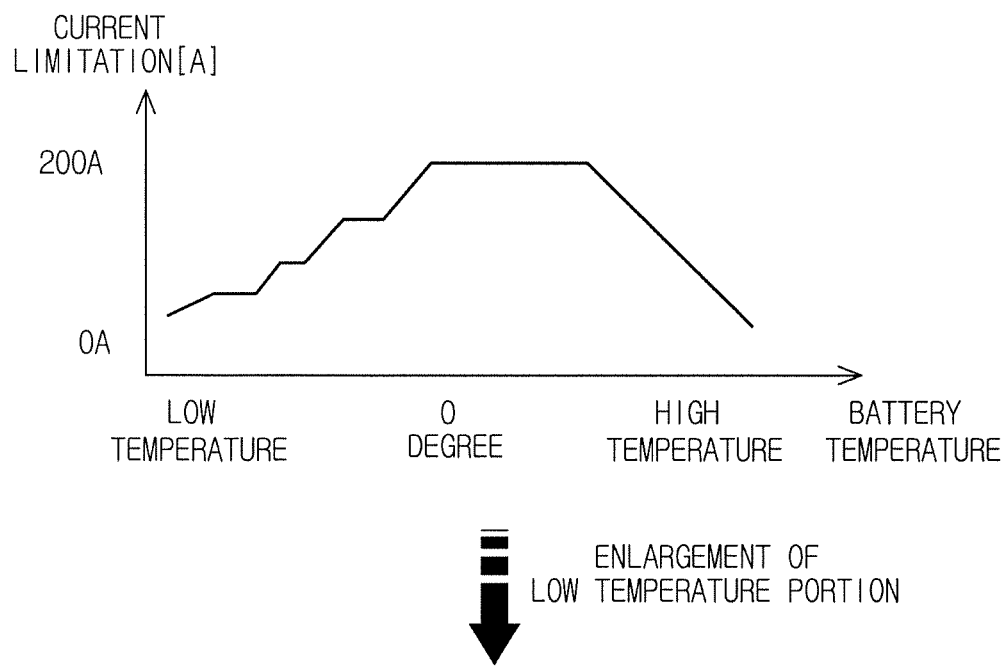
FIGS. 4 to 5 are diagrams for explaining current limitations according to battery temperature.
Figure 4:
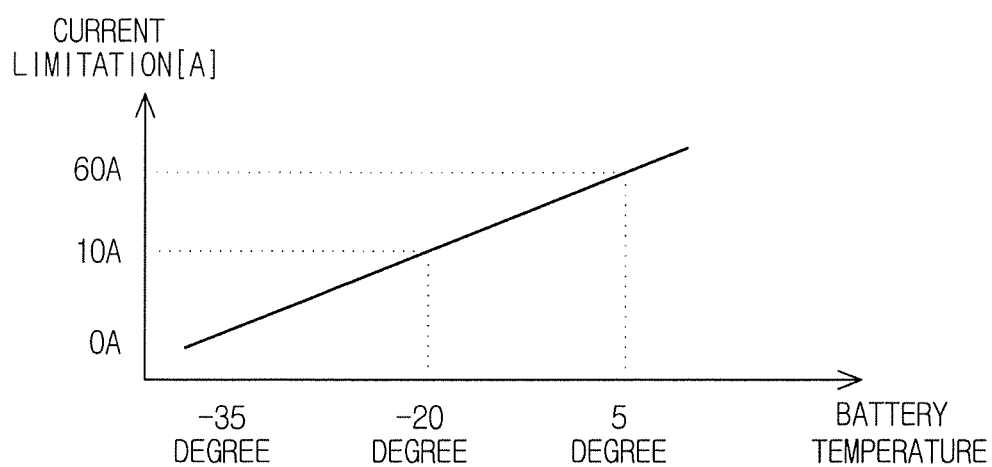

An upper graph of FIG. 4 shows a current limitation map of a common high-voltage battery, and the lower graph of FIG. 4 shows enlargement of a lower temperature portion of the upper graph.

Referring to FIG. 4, it may be seen that the limited current is changed according to the battery temperature and high battery temperature is not required at low current compared battery temperature at high current.

Heating the battery aims to increase battery temperature to prevent the battery from being charged with a lower current than an acceptable current due to limitation of battery charging current if the battery is at a lower temperature. If the battery temperature drops to a low temperature, battery heating is performed, in which case if the current to be charged in the battery is smaller than the current used to heat the battery (e.g., in the case of ICCB battery charging) the SoC of the battery may be low even through the battery is charged. Referring to FIG. 4, in the case of low-current charging such as ICCB battery charging, since the current applied to the battery is relatively low compared to high-current charging, a maximum amount of current that the charger 200 may be able to supply may be received even without heating the battery. Accordingly, in the case of low-current charging, there is no need to heat the battery.

Figure 5:
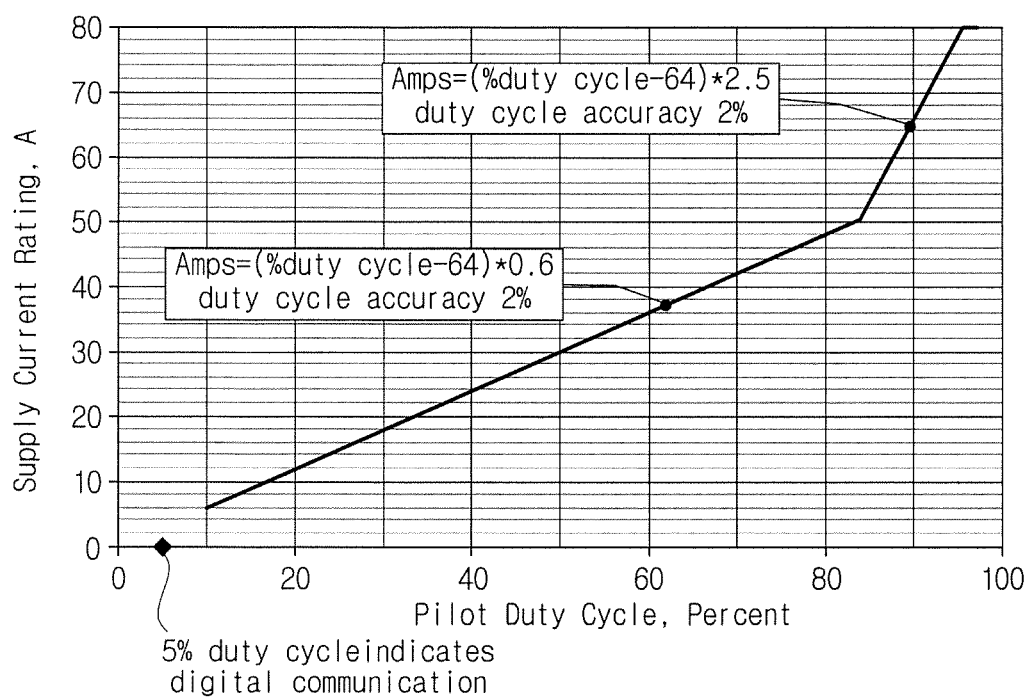

FIG. 5 is a graph representing correlations between Control Pilot (CP) duty and available charging current. In FIG. 5, if a CP duty is lower than about 23 percent, it is determined as low-current charging from e.g., ICCB. If a maximum ICCB current is 13.8 A and a wall power source is about 220V, a current to be charged into the battery is about 8.4 A or less (on the basis of 360V pack). In this case, if battery heating is activated, it turns out that the battery consumes the current rather than being charged with the current. In other words, in the case of low-current charging, heating the battery is unnecessary. The aforementioned ICCB is a charging device for low-current charging by being connected to a wall power source (220V/110V), and the CP duty is lower than about 23% and the charging current may be lower than about 13.8 A.

Figure 6:
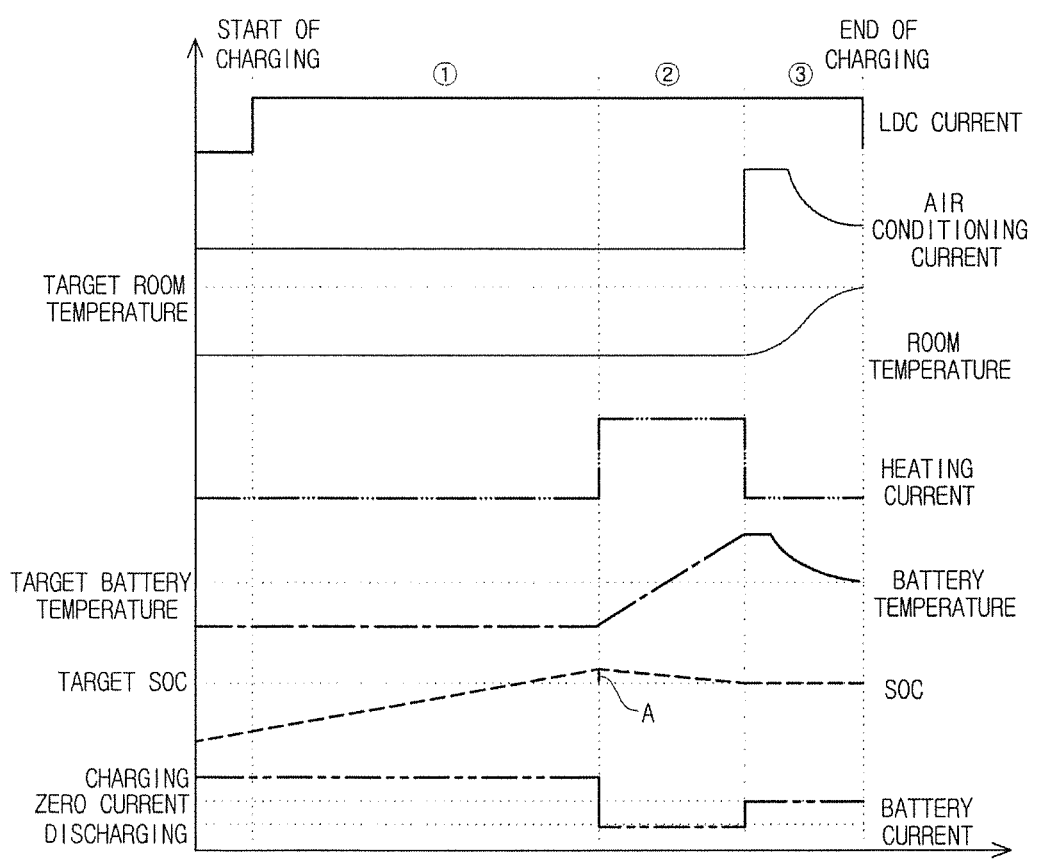
FIGS. 6 to 9 are diagrams for explaining a method for managing a battery for vehicle.

As shown in FIG. 6, the controller 190 may drive the battery heater 160 and the air conditioner 170 after charging the battery 150 to the target charging level (section ① of FIG. 6) if heating of the battery and reserved air conditioning are both requested by the user. Section ② of FIG. 6 may refer to a driving section of the battery heater 160 and section ③ may refer to a driving section of the air conditioner 170. The target charging level may refer to a combination of the user's target SoC and the SoC required for heating the battery.

As shown in FIG. 6, it may be seen that the SoC of the battery exceeds the user's target SoC by 'A' while the battery is being charged. The 'A' refers to an SoC required for heating the battery and may be used in heating the battery. If reserved air conditioning is also requested while the battery is being heated, extra heating may be performed by taking into account an extent of battery temperature to be dropped in performing air conditioning. The extent of battery temperature to be dropped may be represented by (current battery temperature−outside temperature)/10.

The controller 190 may drive the battery heater 160 with the higher priority than the air conditioner 170.

Specifically, when the battery is heated, the limited battery current may increase, but in a case of low-current charging, battery heating is not meaningful because the low-current charging current is smaller than the limited battery current at a very low temperature. Furthermore, since the room temperature is changed in a short period of time in comparison with a change in battery temperature due to e.g., outside temperature, if the air conditioner 170 is driven first, air conditioning needs to be performed again or continuous air conditioning needs to be performed to provide a temperature condition requested when the user gets on the vehicle. In other words, since it takes the battery 150 more time to be cooled off after heated than the room temperature, the battery heater 160 needs to be driven first.

Alternatively, the controller 190 may drive the air conditioner 170 with the higher priority than the battery heater 160 at the operator's request.

Figure 7:
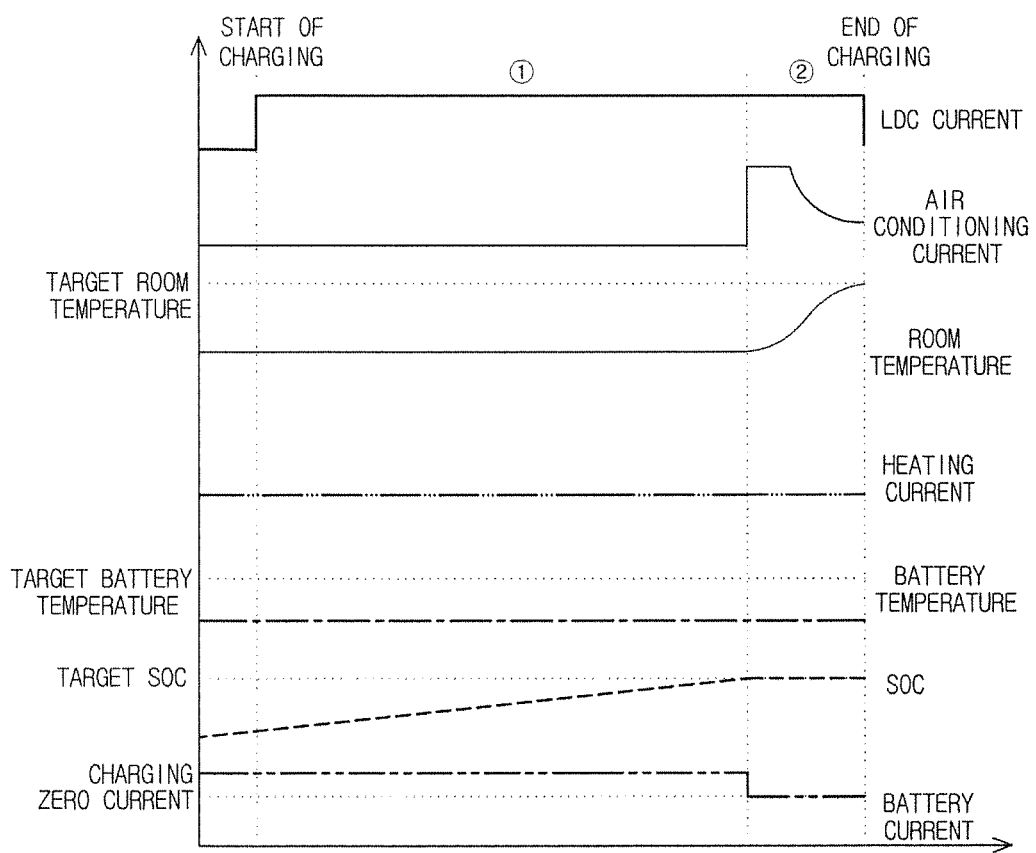

As shown in FIG. 7, if reserved air conditioning is requested by the user, the controller 190 may drive the air conditioner 170 (section ② of FIG. 7) taking into account a starting time of the vehicle after charging the battery 150 to the target charging level (section ① of FIG. 7). The target charging level may be the user's target SoC.

Figure 8:
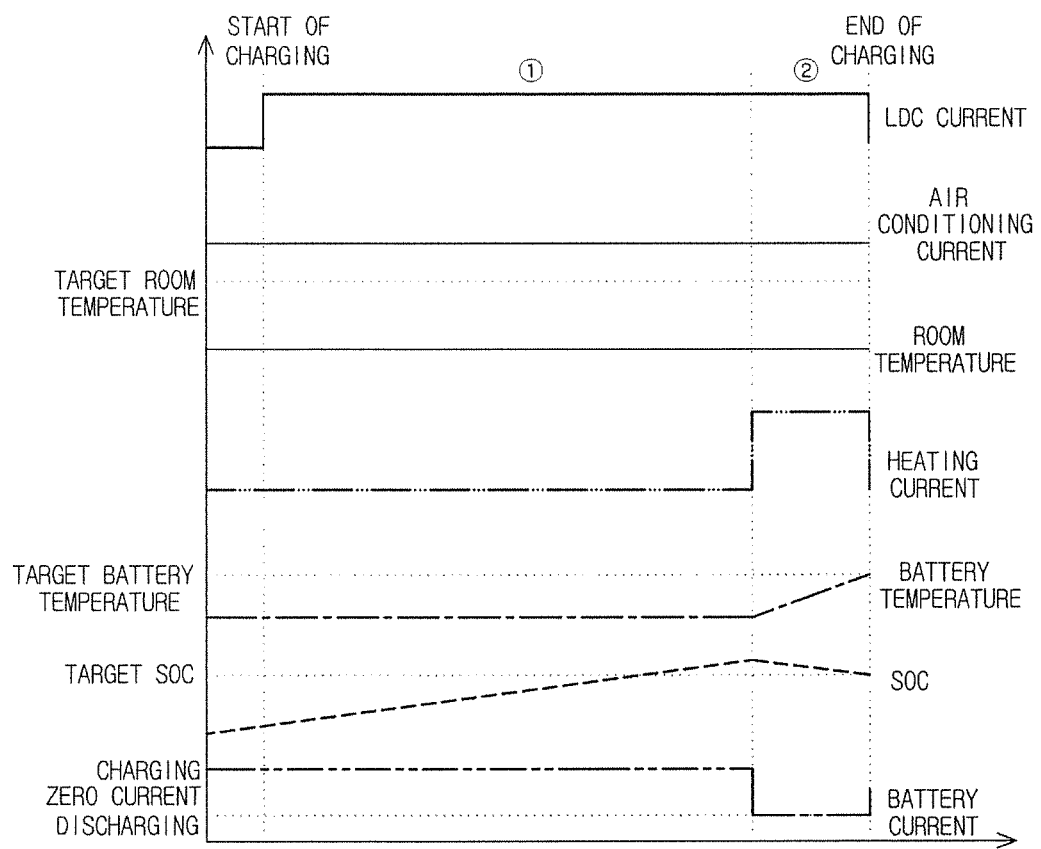

As shown in FIG. 8, if heating of the battery 150 is requested by the user, the controller 190 may drive the battery heater 160 (section ② of FIG. 8) after charging the battery 150 to the target charging level (section ① of FIG. 8). The target charging level may refer to a combination of the user's target SoC and the SoC required for heating the battery. Since the battery charging is completed at the time when heating of the battery is finished, there is no need for extra heating considering an extent of drop of battery temperature. Furthermore, if only battery charging and heating is requested, it may require less time to heat the battery before completion of battery charging as compared with the case of performing both battery heating and air conditioning.

Figure 9:
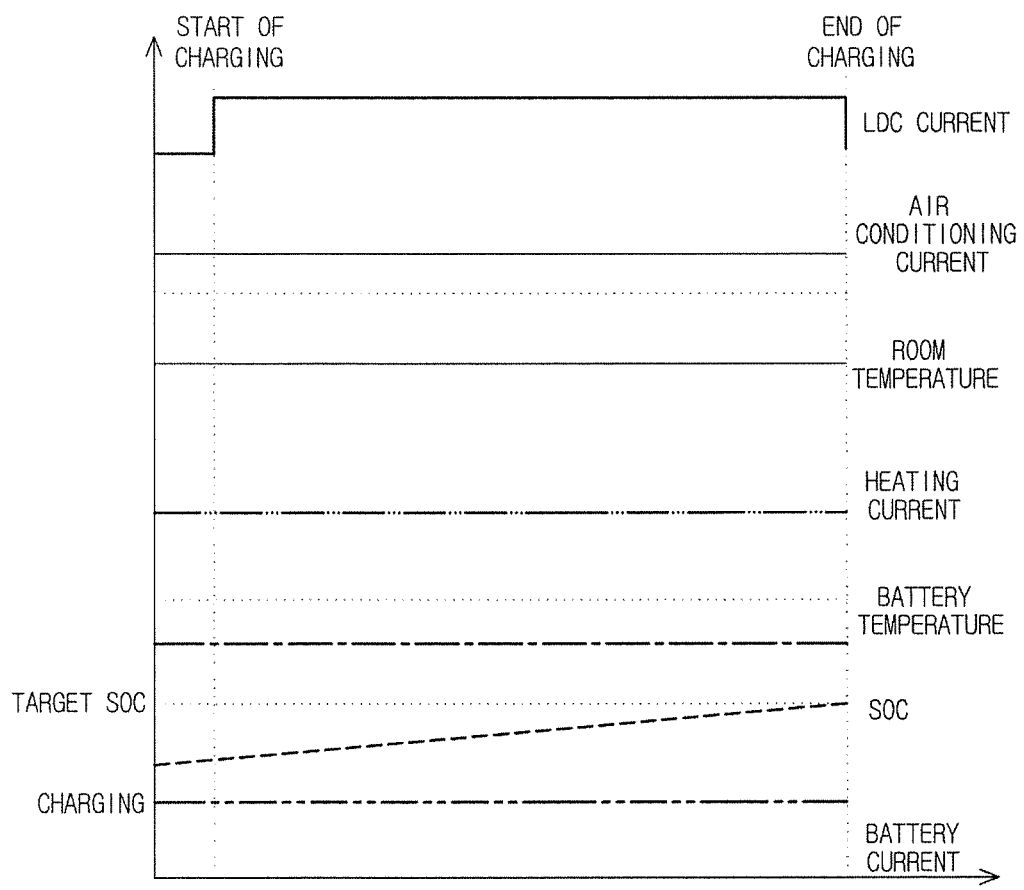

If only charging of the battery 150 is requested in a low-current charged state, the controller 190 may just charge the battery to the target charging level (see FIG. 9). The target charging level may be the user's target SoC.

The controller 190 may be implemented with a memory (not shown) storing an algorithm to control operation of the components of the vehicle 100 or data about a program that implements the algorithm, and a processor (not shown) carrying out the aforementioned operation using the data stored in the memory. The memory and the processor may be implemented in separate chips. Alternatively, the memory and the processor may be implemented in a single chip.

Figure 10:
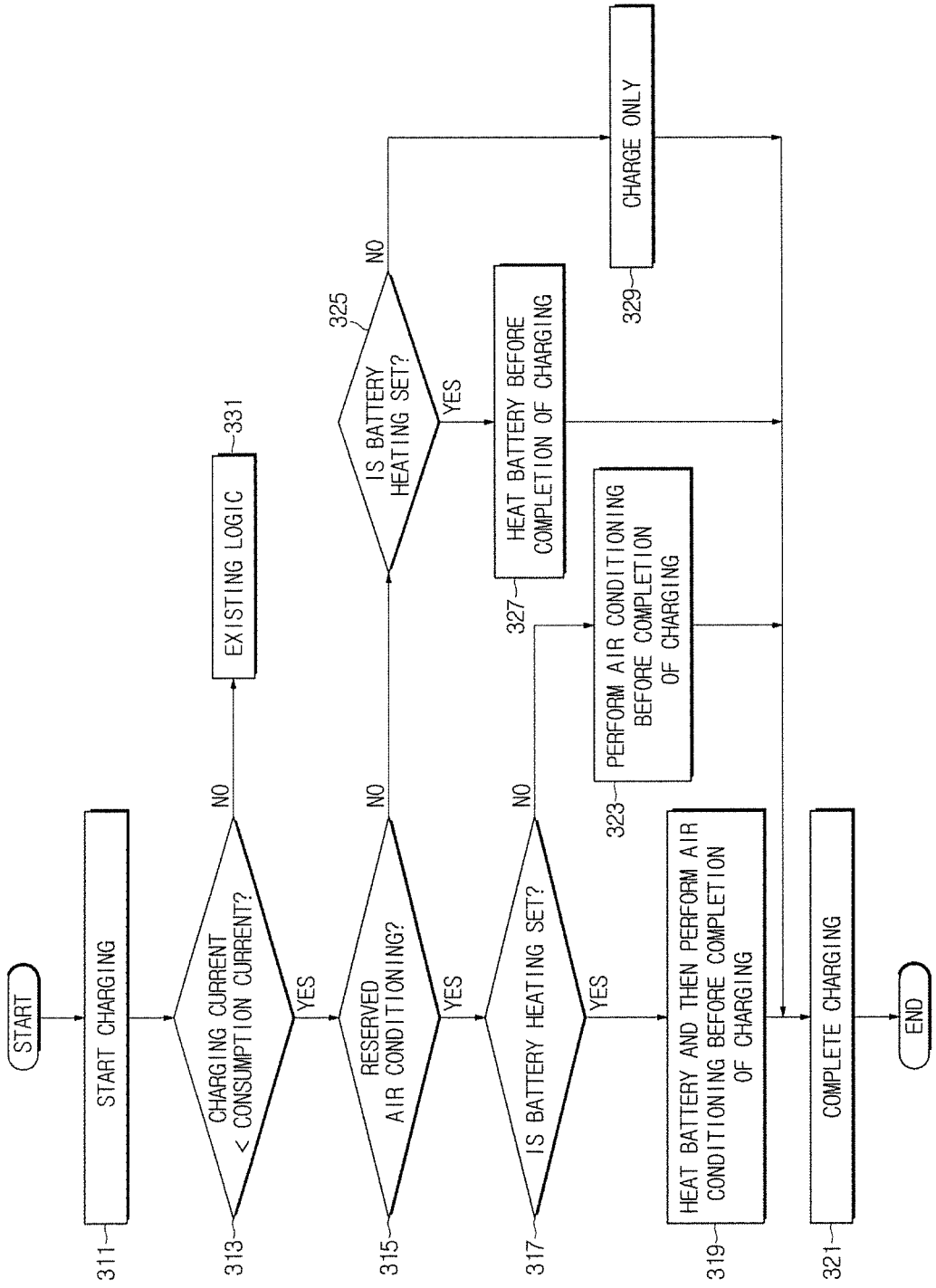
FIG. 10 is a flowchart illustrating a method for managing a battery for vehicle.

FIG. 10 is a flowchart illustrating a method for managing a battery for vehicle.

Referring to FIG. 10, the vehicle 100 may start charging the battery 150, in 311.

The vehicle 100 may compare levels of the charging current for the battery 150 and consumption current, in 313. The consumption current may refer to a current required to manage the vehicle, including a battery heating current, an LDC driving current, and an air conditioning current.

The vehicle 100 may distribute the charging current for the battery 150 first and foremost to maintain the battery to be charged, if the charging current is smaller than the consumption current. After this, at a request for reserved air conditioning or battery charging, the vehicle 100 may drive the battery heater 160 or the air conditioner 170.

Specifically, the vehicle 100 may check whether reserved air conditioning is requested if the charging current for the battery is smaller than the consumption current, in 315.

If it is determined that the reserved air conditioning is requested, the vehicle 100 may check whether heating of the battery is requested through a setting of battery heating, in 317.

If it is determined that heating of the battery is requested, the vehicle 100 may drive the battery heater 160 and the air conditioner 170 after the SoC of the battery reaches a target charging level when charging the battery 150, in 319.

Before distributing the charging current for the battery first, if heating of the battery and reserved air conditioning are requested by the user, the vehicle 100 may distribute the charging current until the SoC of the battery reaches the target charging level and then distribute heating current and air conditioning current. In this regard, the vehicle 100 may drive the battery heater 160 with the higher priority than the air conditioner 170.

The target charging level may include the user's target SoC or an SoC required for heating the battery. If only battery charging is requested or if both battery charging and reserved air conditioning are requested, the target charging level may include the user's target SoC. On the other hand, if both heating of the battery and reserved air conditioning are requested or if only heating of the battery is requested, the target charging level may include the user's target SoC and the SoC required to heat the battery. That is, the target charging level may refer to a combination of the user's target SoC and the SoC required for heating the battery.

Then, the vehicle 100 may stop the charging process, in 321.

An occasion when reserved air conditioning is requested by the user before the charging current for the battery is distributed first will now be described.

If it is determined in 317 that heating of the battery is not requested, the vehicle 100 may drive the air conditioner 170 considering a starting time of the vehicle after the SoC of the battery reaches a target charging level when charging the battery 150, in 323. Specifically, the vehicle 100 charges the battery to the target charging level by distributing the charging current for the battery, and then drive the air conditioner 170 considering a starting time of the vehicle 100 set by the user in advance to make the interior space of the vehicle 100 pleasant before charging is completed.

An occasion when heating of the battery is requested by the user before the charging current for the battery is distributed first will now be described.

If it is determined in 315 that not reserved air conditioning but heating of the battery is requested, the vehicle 100 may drive the battery heater after the SoC of the battery reaches the target charging level while charging the battery, in 325, 327. In other words, the vehicle 100 charges the battery to the target charging level by distributing the charging current for the battery, and then performs battery heating before charging of the battery is completed.

If only the battery charging is requested, the vehicle 100 may charge the battery until the SoC of the battery 150 reaches the target charging level, in 329.

While charging the battery 150, the vehicle 100 may not perform heating operation on the battery 150 until the SoC of the battery 150 reaches the target charging level.

On the other hand, if the charging current is equal to or greater than the consumption current in 313, the vehicle 100 may perform a common battery charging operation that performs both battery heating and charging 331.

According to embodiments of the present disclosure, a battery charging efficiency may be improved by charging the battery while not performing heating of the battery during low-current battery charging.

Furthermore, priorities are set for battery charging, battery heating, and air conditioning during low-current battery charging, thereby keeping battery charging and vehicle conditions pleasant.

Meanwhile, the embodiments of the present disclosure may be implemented in the form of recording media for storing instructions to be carried out by a computer. The instructions may be stored in the form of program codes, and when executed by a processor, may generate program modules to perform operation in the embodiments of the present disclosure. The recording media may correspond to computer-readable recording media.

The computer-readable recording medium includes any type of recording medium having data stored thereon that may be thereafter read by a computer. For example, it may be a ROM, a RAM, a magnetic tape, a magnetic disk, a flash memory, an optical data storage device, etc.

The embodiments of the present disclosure have thus far been described with reference to accompanying drawings. It will be obvious to people of ordinary skill in the art that the present disclosure may be practiced in other forms than the embodiments as described above without changing the technical idea or essential features of the present disclosure. The above embodiments are only by way of example, and should not be interpreted in a limited sense.

What is claimed is:

1. A vehicle comprising:
a battery configured to be charged and discharged while connected to a charger; and
a controller configured to:
charge the battery by distributing charging current for the battery with a foremost priority if the charging current for the battery is smaller than consumption current, and
heat the battery by distributing the consumption current after a state of charge (SoC) of the battery reaches a target charging level,
wherein the controller, when an air conditioning is scheduled, performs extra heating of the battery before performing the air conditioning based on a degree of decrease in temperature of the battery expected by performing the air conditioning.

2. The vehicle of claim 1, wherein the controller is configured to maintain the battery not to be heated until the SoC of the battery reaches the target charging level.

3. The vehicle of claim 1, wherein if battery charging only is requested, the target charging level includes a user's target SoC.

4. The vehicle of claim 1, further comprising:
a battery heater configured to heat the battery; and
an air conditioner configured to manage temperature, humidity, and air cleanliness in the vehicle.

5. The vehicle of claim 4, wherein the controller is configured to drive the battery heater and the air conditioner after the battery is charged to the target charging level, if battery charging and reserved air conditioning are requested by a user.

6. The vehicle of claim 5, wherein the target charging level includes a user's target SoC or an SoC required for heating the battery.

7. The vehicle of claim 5, wherein the controller is configured to drive the battery heater with a higher priority than the air conditioner.

8. The vehicle of claim 4, wherein the controller is configured to drive the air conditioner considering a starting time of the vehicle after the battery is charged to the target charging level, if reserved air conditioning is requested by a user.

9. The vehicle of claim 8, wherein the target charging level includes a user's target SoC.

10. The vehicle of claim 4, wherein the controller is configured to drive the battery heater after the battery is charged to the target charging level, if battery heating is requested by a user.

11. The vehicle of claim 1, wherein the consumption current comprises
a current required to manage the vehicle including a battery heating current, an Low Voltage DC-DC Converter (LDC) driving current, and an air conditioning current.

12. A method for managing a battery of a vehicle, the method comprising:
starting charging of the battery;
comparing charging current for the battery and consumption current;
keeping the battery charged by distributing the charging current for the battery with a top priority, if the charging current for the battery is smaller than the consumption current;
heating the battery by distributing the consumption current after a state of charge (SoC) of the battery reaches a target charging level; and
performing, when an air conditioning is scheduled, extra heating of the battery before performing the air conditioning based on a degree of decrease in temperature of the battery expected by performing the air conditioning.

13. The method of claim 12, further comprising: maintaining the battery not to be heated until a state of charge (SoC) of the battery reaches a target charging level, when the battery is charged.

14. The method of claim 13, wherein the target charging level includes a user's target SoC or an SoC required for heating the battery.

15. The method of claim 12, further comprising: if battery heating and reserved air conditioning are requested by a user before distributing the charging current for the battery with the top priority, driving a battery heater and an air conditioner after an SoC of the battery reaches a target charging level when the battery is charged.

16. The method of claim 15, wherein driving the battery heater and the air conditioner after the SoC of the battery reaches the target charging level when the battery is charged comprises driving the battery heater with the higher priority than the air conditioner.

17. The method of claim 12, further comprising: if reserved air conditioning is requested by a user before the charging current for the battery is distributed first, driving an air conditioner considering a starting time of the vehicle after an SoC of the battery reaches a target charging level when the battery is charged.

18. The method of claim 12, further comprising: if heating of the battery is requested by a user before the charging current for the battery is distributed first, driving a battery heater after an SoC of the battery reaches a target charging level when the battery is charged.

19. The method of claim 12, wherein the consumption current comprises
a current required to manage the vehicle including a battery heating current, an Low Voltage DC-DC Converter (LDC) driving current, and an air conditioning current.

* * * * *